UNITED STATES PATENT OFFICE.

ALCIDE FRANCOIS POIRRIER, OF PARIS, FRANCE, ASSIGNOR TO STE. AME DES MATIÈRES COLORANTES ET PRODUITS CHIMIQUES DE ST. DENIS, OF PARIS, FRANCE.

BLUE SULFUR DYE AND PROCESS OF MAKING SAME.

SPECIFICATION forming part of Letters Patent No. 708,662, dated September 9, 1902.

Application filed March 29, 1901. Serial No. 53,519. (No specimens.)

*To all whom it may concern:*

Be it known that I, ALCIDE FRANCOIS POIRRIER, of Paris, France, have invented certain new and useful Improvements in the Manufacture of Blue Dyestuffs, which improvements are fully described in the following specification.

In Patent No. 646,873, dated April 3, 1900, I have described and claimed a new process for the preparation of sulfureted colors, and these colors dye cotton directly and consist in causing the products of the reaction of chlorid of sulfur on phenol or on the cresols (commercial cresol) to react upon aromatic bodies—polyamids, amidohydroxylenes, (especially paraphenylenediamin, paramidophenol, and paraoxydiamidoparaoxydiphenylamin.)

Example 1. First, one hundred and fifty parts of the indophenol obtained by oxidation of an equimolecular mixture of paraphenylenediamin and phenol are dissolved in a solution of five hundred parts of sodium sulfid in cold water; second, after some hours the mixture is gently heated to about 120° to 130° centigrade, and there is at once added the product of the action of two hundred parts of sulfur chlorid on one hundred parts of phenol. This mixture is heated for two hours at 130° centigrade, and the temperature is then slowly raised to 150° to 160° centigrade, so as to evaporate the water without passing this temperature, and thus to obtain a dry mass, which constitutes the new dyestuff and may be sent to market in this form. It is very soluble in water, giving a blue solution, from which it is completely precipitated by acids, the precipitate being soluble in soda and especially in alkali sulfids. Solutions in the latter or the aqueous solution dye unmordanted cotton in the same manner as the sulfur blacks do, but the tints are a beautiful blue of high resistance. In this example the product of the action of sulfur chlorid on commercial cresol may be substituted for that of the action of sulfur chlorid on phenol.

Example 2. Instead of employing, as in Example 1, indophenol made by the oxidation of a mixture of paraphenylenediamin and of phenol indophenol may be employed, obtained by the oxidation of an equimolecular mixture of paraphenylenediamin and of ortho cresol.

One hundred and sixty parts of indophenol are reduced by three hundred parts of sodium sulfid at a temperature below the freezing-point. The mixture is slowly heated from 120° to 130°, and when the mass has become pasty I add two hundred parts of the product of the reaction of the chlorid of sulfur on phenol. The mixture of substances is heated for about three hours from 140° to 150° until desiccation is complete. The new color is in the form of a black powder, soluble in water with difficulty, but very soluble in water containing caustic soda or sulfid of sodium. The dye in solution can be used directly for coloring cotton. The product of the reaction of chlorid of sulfur on phenol can be substituted by the product of the reaction of the chlorid of sulfur on cresol.

What is claimed is—

1. The herein-described process of producing coloring-matter consisting in treating a solution of an indophenol and sodium sulfid, with the product resulting from the action of chlorid of sulfur on phenols.

2. The herein-described process of producing coloring-matter consisting in oxidizing a mixture of paraphenylenediamin and a phenol, forming a solution of the indophenol thus obtained with sodium sulfid, and then treating said solution with the product resulting from the action of chlorid of sulfur on phenols.

3. The described coloring-matter obtained by oxidizing a mixture of paraphenylenediamin and a phenol, forming a solution of the indophenol thus obtained with sodium sulfid, and then treating said solution with the product resulting from the action of chlorid of sulfur on phenols, the said coloring-matter being black in appearance, very soluble in water giving a blue solution from which it is completely precipitated by acids, the precipitate being soluble in soda and especially in alkali sulfids, and solutions thereof in alkali sulfids or water dyeing unmordanted cotton in blue tints of high resistance.

In witness whereof I have hereunto signed my name in the presence of two subscribing witnesses.

ALCIDE FRANCOIS POIRRIER.

Witnesses:
JULES ARMENGAUD, Jeune,
EDWARD P. MACLEAN.